(12) United States Patent
Orr (10) Patent No.: US 7,193,396 B2
(45) Date of Patent: Mar. 20, 2007

(54) DC CONVERTERS HAVING BUCK OR BOOST CONFIGURATIONS

(75) Inventor: Ray Orr, Kanata (CA)

(73) Assignee: Potentia Semiconductor Corporation, Kanata (CA)

( * ) Notice: Subject to any disclaimer, the term of this patent is extended or adjusted under 35 U.S.C. 154(b) by 378 days.

(21) Appl. No.: 10/744,019

(22) Filed: Dec. 24, 2003

(65) Prior Publication Data

US 2005/0146310 A1 Jul. 7, 2005

(51) Int. Cl.
*G05F 1/613* (2006.01)
*G05F 1/40* (2006.01)

(52) U.S. Cl. .................. 323/225; 323/259; 323/290; 363/20

(58) Field of Classification Search ............... 323/222, 323/225, 247, 259, 290; 363/20, 97, 131
See application file for complete search history.

(56) References Cited

U.S. PATENT DOCUMENTS

| | | | |
|---|---|---|---|
| 4,031,453 A | * | 6/1977 | Teuling ........................ 363/20 |
| 5,610,804 A | * | 3/1997 | Shimizu ...................... 363/131 |
| 6,252,383 B1 | * | 6/2001 | Wittenbreder ............... 323/222 |

OTHER PUBLICATIONS

Rudy Severns—International Rectifier Corp. "Switchmode and Resonant Converter Circuits", Jun. 28, 1982.

* cited by examiner

*Primary Examiner*—Jessica Han (57) ABSTRACT

An inductor in a series path of a DC converter having a buck or boost configuration is constituted by a transformer with windings in series with switches of the converter. A transformer turns ratio facilitates matching switch voltage and current stresses to characteristics of MOSFETs forming the switches. A high side MOSFET can have its source at a constant voltage to facilitate driving this switch. One switch can be replaced by a diode. A transformer leakage energy removal circuit can provide an auxiliary output voltage, greater than the input voltage for a buck configuration.

25 Claims, 6 Drawing Sheets

DC CONVERTERS HAVING BUCK OR BOOST CONFIGURATIONS

This invention relates to DC converters having buck or boost configurations. DC converters are also referred to as. DC-to-DC converters, DC or DC-to-DC regulators, switch mode regulators, converters, power converters, or power supplies, etc.; the term "DC converter" or simply "converter" is used primarily herein to include all such terms.

These terms as used herein also embrace converters for which a supply coupled to the input circuit can comprise a relatively low frequency alternating or varying voltage optionally with a DC component, and/or for which the output can comprise a relatively low frequency alternating or varying voltage optionally with a DC component (e.g. a telephone ringing signal), in other words a DC converter that can operate in all quadrants.

BACKGROUND

There is a wide variety of known DC converter topologies or configurations which are derived from at least one buck regulator and/or at least one boost regulator, with or without a transformer that may provide voltage transformation and/or electrical isolation between input and output circuits of the converter. As is known, without voltage transformation a buck regulator provides an output voltage which is lower than its input voltage, and a boost regulator provides an output voltage which is greater than its input voltage. Buck and boost regulators can be regarded as duals of one another; for example, with switches replacing diodes a buck converter can be operated in a reverse direction as a boost regulator.

One DC converter topology comprises a cascade of a buck regulator followed by a boost regulator, forming a buck-boost converter. An inductor of a buck-boost converter can be arranged as two windings of a transformer, forming a flyback converter which has a well known form. In a flyback converter, the transformer constituted by the inductive component of the converter can provide voltage transformation and/or electrical isolation between the input and output circuits of the converter.

Significant technical obstacles need to be overcome by DC converters having a large ratio, for example of about 10:1, between input and output voltages of the converter without using a transformer for voltage transformation. There is an increasing need for non-isolating converters providing such large voltage ratios, for example for providing low supply voltages (for example of the order of one volt) to power electronic circuits.

One of these obstacles is, typically, a need to drive the gate of one of the MOSFET switches of the converter at a voltage level above that of the converter input voltage. The flyback converter topology discussed above avoids this problem, but achieves this at the expense of higher peak currents, for example four times higher in discontinuous mode.

Another of these obstacles is a need to power a control circuit of the converter from the input voltage in order to start up the converter. This adds complexity to the control circuit, with a need for high voltage components to withstand the relatively (compared to the output voltage) high input voltage. Such components are not easy to incorporate in an integrated circuit form of the control circuit.

The non-isolating converter topology most commonly used to provide an output voltage lower than the input voltage is that of the buck regulator, typically comprising two MOSFET switches referred to as the high side and low side switches or MOSFETs. Both of these switches must be rated for the maximum input voltage and the maximum output or load current. With large input to output voltage ratios, these MOSFETs must be physically large to withstand voltage and current stresses. Consequently, these MOSFETs have high parasitic capacitances which must be driven for correct switching, and the resulting switching losses become the dominant contributor to loss of efficiency at high switching frequencies, for example above about 500 kHz. Achieving-switching speeds for correct switching of the converter at the very low duty cycles at which the buck regulator must operate also requires high peak gate drive currents, and significantly increases the impact of parasitic inductances at high switching frequencies.

Accordingly, there is a need to provide an improved DC converter in which some or all of these difficulties are reduced or avoided.

SUMMARY OF THE INVENTION

According to one aspect of this invention there is provided a DC converter comprising two input terminals, two output terminals, an output capacitor coupled between the two output terminals, an inductance in a series path between the input and output terminals, a-first controlled switch, and a diode or a second controlled switch, the converter having a buck or boost configuration for producing an output voltage at the output terminals from an input voltage supplied to the input terminals, wherein the inductance is provided by a transformer having one winding coupled in series with the first controlled switch and another winding coupled in series with the diode or second controlled switch.

In one form of the invention, said one winding and the first controlled switch are coupled in said series path between the input and output terminals, and said another winding and the diode or second controlled switch are coupled in series between the two output terminals, the DC converter having a buck configuration.

Preferably the first controlled switch is coupled in said series path between said one winding and one of the output terminals. Conveniently the first controlled switch comprises a MOSFET having its source coupled to said one of the output terminals. Thus the source of the MOSFET is at the relatively low and fixed output voltage, enabling the gate of the MOSFET to be driven with a relatively low voltage.

When the diode or second controlled switch comprises a second controlled switch, this can conveniently be a MOSFET also having its source coupled to said one of the output terminals.

Preferably said one winding has more turns than said another winding.

The DC converter can also comprise a leakage energy removal circuit coupled to one of the windings of the transformer. For example, the leakage energy removal circuit can comprise a diode coupling a parallel combination of a capacitor and a resistor to one of said windings, preferably said one winding, enabling an auxiliary output voltage to be derived from a junction of the diode, capacitor, and resistor of the leakage energy removal circuit. Alternatively, the leakage energy removal circuit can comprise a controlled switch for coupling a capacitor to one of the windings of the transformer.

In another form of the invention, said one winding and the first controlled switch are coupled in series between the two input terminals, and said another winding and the diode or second controlled switch are coupled in said series path between the input and output terminals, the DC converter having a boost configuration.

Conveniently in this case the diode or second controlled switch is coupled in said series path between one of the input terminals and said another winding. The diode or second controlled switch can comprise a MOSFET having its source coupled to said one of the input terminals. The first controlled switch can also comprise a MOSFET having its source coupled to said one of the input terminals. In this form of the invention preferably said another winding has more turns than said one winding.

Another aspect of the invention provides a DC converter having a buck or boost configuration and comprising a first controlled switch, an inductor, a diode or a second controlled switch, and an output capacitor for producing at output terminals of the converter an output voltage in response to an input voltage supplied to input terminals of the converter, wherein the inductor is in a series path between the input and output terminals and comprises a transformer having a first winding in series with the first switch and a second winding in series with the diode or second controlled switch.

A further aspect of the invention provides a DC converter comprising: two output terminals; an output capacitor coupled between the two output terminals; a transformer having first and second windings; a first switch for coupling the output capacitor via the first winding to an input voltage when the first switch is closed; and a diode or second switch for coupling the second winding to the output capacitor when the first switch is open.

In this aspect of the invention, preferably the first switch comprises a MOSFET having a source coupled to the output capacitor and a drain coupled to the first winding. The diode or second switch can conveniently comprise a MOSFET, which can have a source coupled to the output capacitor and a drain coupled to the second winding. Preferably the first winding has more turns than the second winding. This DC converter can include a passive leakage energy removal circuit coupled to the first winding and providing an auxiliary output voltage greater than the input voltage.

A further aspect of the invention provides a DC converter comprising: two output terminals; an output capacitor coupled between the two output terminals; a transformer having first and second windings; a first switch for coupling the second winding to an input voltage when the first switch is closed; and a diode or second switch for coupling the output capacitor via the first winding to the input voltage when the first switch is open.

In this aspect of the invention, preferably the diode or second switch comprises a MOSFET having a source coupled to the input voltage and a drain coupled to the first winding. The first switch can comprise a MOSFET having a source coupled to the input voltage and a drain coupled to the second winding. Preferably the first winding has more turns than the second winding.

BRIEF DESCRIPTION OF THE DRAWINGS

The invention will be further understood from the following description by way of example with reference to the accompanying drawings, in which.

DETAILED DESCRIPTION

In FIGS. 1 to 7 of the drawings, various forms of regulator or DC converter are illustrated. For convenience, and to illustrate a correlation among elements of the regulators or converters, in each of these figures the elements of the converter are denoted by a two-digit reference numeral, in which the first digit corresponds to the figure number and the second digit represents a respective element of the regulator or converter.

More particularly, denoting the first digit as f to correspond to the figure number, the regulators or converters of FIGS. 1 to 7 generally (with exceptions as described below) comprise: two terminals f0 shown at the left of the respective figure; two terminals f1 shown at the right of the respective figure; a common line f2 between one of the terminals f0 and one of the terminals f1; a switch or diode f3 and an inductor f4 in a series path between the other of the terminals f0 and the other of the terminals f1; a switch or diode f6 between a junction of the elements f4 and f5 and the common line f2; a capacitor f5 connected between the two terminals f1; and a capacitor f7 connected between the two terminals f0.

Figure 1:
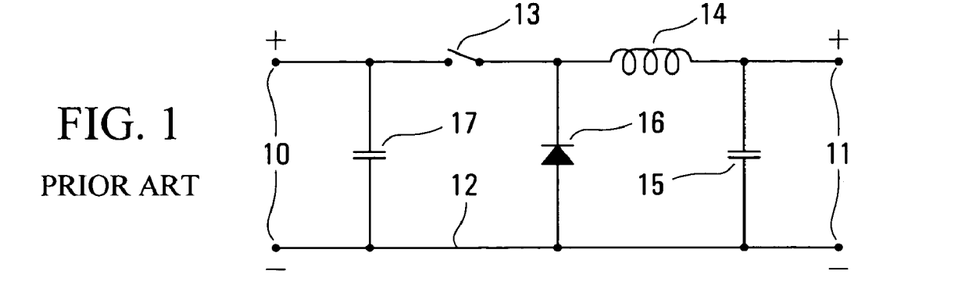
FIG. 1 schematically illustrates a known buck regulator.

FIG. 1 illustrates a known buck regulator, in which the terminals 10 are input terminals, the terminals 11 are output terminals, and the capacitors 17 and 15 are input and output capacitors respectively. The input capacitor may be omitted or incorporated in a source of an input voltage supplied to the input terminals, but is illustrated here to show the correspondence among different figures; the same applies for the input capacitance in the other figures.

In addition, in the buck regulator of FIG. 1 the elements 13 and 16 are a switch and a diode respectively as shown, the switch 13 being connected on the input side and the inductor 14 being connected on the output side of the regulator. With a DC input voltage supplied to the input terminals 10 with the polarity shown, and the switch 13 controlled by a control circuit (not shown) to open and close at a desired operating frequency, the buck regulator of FIG. 1 produces at its output terminals 11 a DC output voltage, with the polarity shown, less than the input voltage and determined by a duty cycle of the switch 13. As is well known in the art, when the switch 13 is closed, current from a DC supply connected to the input terminals 10 supplies a load connected to the output terminals 12 and stores energy in the inductor 14. Current flow in the inductor 14 is maintained via the diode 16 when the switch 13 is open, the capacitors 17 and 15 providing voltage smoothing at the input and output terminals respectively.

Figure 2:
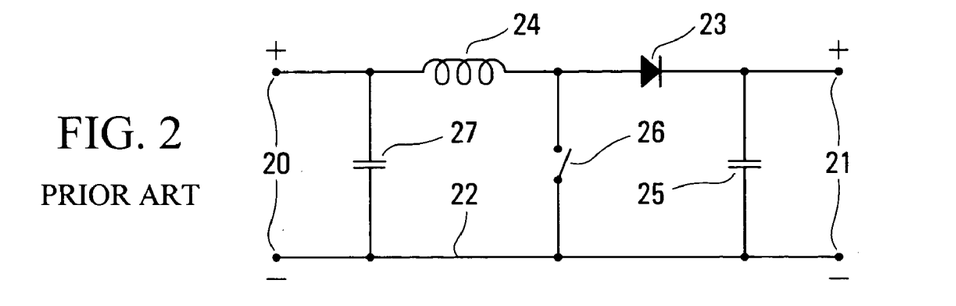
FIG. 2 schematically illustrates a known boost regulator.

FIG. 2 illustrates a known boost regulator, in which the terminals 20 are input terminals, the terminals 21 are output terminals, and the capacitors 27 and 25 are input and output capacitors respectively, the input capacitor being optional as described above. The elements 23 and 26 are a diode and a switch respectively as shown, the diode 23 being connected on the output side and the inductor 24 being connected on the input side of the regulator. With a DC input voltage supplied to the input terminals 20 with the polarity shown, and the switch 26 controlled by a control circuit (not shown) to open and close at a desired operating frequency, the boost regulator of FIG. 2 produces at its output terminals 21 a DC output voltage, with the polarity shown, greater than the input voltage and determined by a duty cycle of the switch 26. As is well known in the art, when the switch 26 is closed, current from a DC supply connected to the input terminals 20 stores energy in the inductor 24. When the switch 26 is open, current flow in the inductor 24 is maintained via the diode 23 to supply current to a load connected to the output terminals 21, the capacitors 27 and 25 providing smoothing at the input and output terminals respectively.

Figure 3:
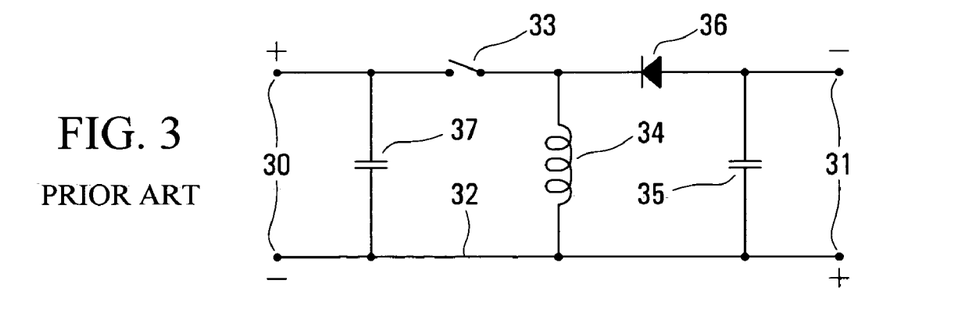
FIG. 3 schematically illustrates a known buck-boost regulator.

FIG. 3 illustrates a known buck-boost regulator, which can be derived from a cascade of the buck regulator of FIG. 1 followed by the boost regulator of FIG. 2, with some consolidation and rearrangement of the components, and which operates accordingly. In the buck-boost regulator of FIG. 3, the terminals 30 are input terminals, the terminals 31 are output terminals, and the capacitors 37 and 35 are input and output capacitors respectively, the input capacitor being optional as described above.

In the buck-boost regulator of FIG. 3, the elements 33, 34, and 36 are rearranged, the element 33 being a switch connected between the input of the regulator and a junction point, the inductor 34 being connected in a shunt path between the junction point and the common line 32, and the element 36 being a diode connected between the junction point and the output of the regulator, the polarity of which is reversed as illustrated in FIG. 3.

Figure 4:
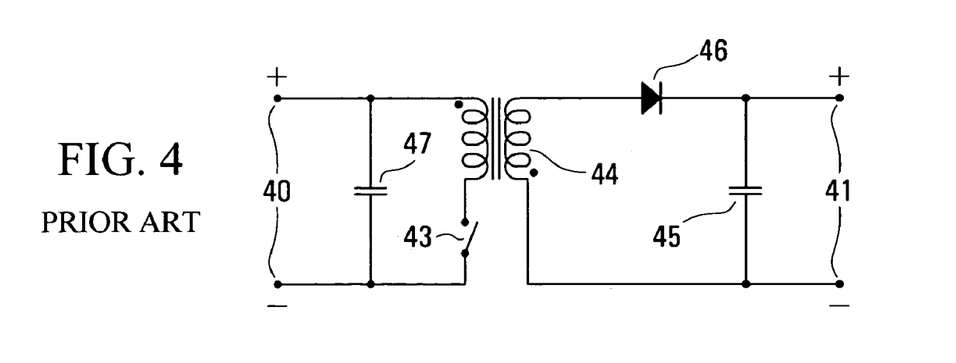
FIG. 4 schematically illustrates a known flyback converter.

FIG. 4 illustrates a known flyback converter, which can be derived from the buck-boost regulator of FIG. 3 by dividing the inductor 34 into two coupled windings to constitute a transformer 44, interchanging the positions of the switch 43 and primary winding of the transformer 44, and inverting polarities on the secondary side of the transformer, and hence at the output of the converter, as shown in FIG. 4 in conventional manner by dots adjacent to the windings of the transformer 44. In the flyback converter of FIG. 4, the transformer 44 constitutes and replaces an inductor in a shunt path, thereby providing electrical isolation (there is no common line) between the input terminals 40 and the output terminals 41; the transformer 44 can also provide voltage transformation between the input and output of the converter.

It is known that in DC converters diodes can be replaced by appropriately controlled switches; this may be desirable in order to reduce losses and/or to make the converter bidirectional. For example, in the buck and boost regulators of FIGS. 1 and 2 the diodes 16 and 23 can be replaced by switches operated in a complementary manner to the switches 13 and 26 respectively. With such replacement, it can be seen that the topology of the boost regulator of FIG. 2 is the reverse of that of the buck regulator of FIG. 1. In other words, with replacement of the diode 16 in FIG. 1 by a switch, the circuit can operate as a buck regulator as described above, or as a boost regulator with the terminals 11 constituting the input terminals and the terminals 10 constituting the output terminals.

Figure 5:
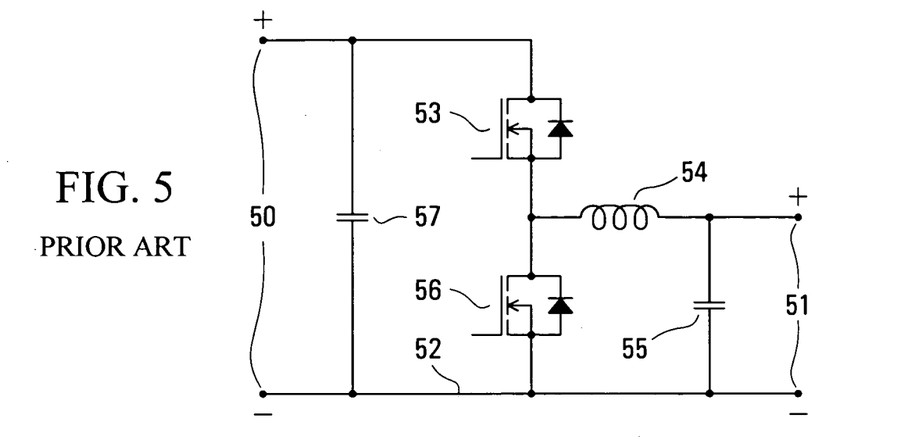
FIG. 5 schematically illustrates a known DC converter using two MOSFET switches.

FIG. 5 illustrates such a DC converter, in which each of the switches 53 and 56 is constituted by an N-channel MOSFET, illustrated with its reverse parallel diode conductive from the source to the drain of the MOSFET. A control circuit, which controls the MOSFETs 53 and 56 via their gates typically with delayed turn-on of each MOSFET to avoid simultaneous conduction of the MOSFETS, is not shown in FIG. 5. The converter of FIG. 5 can operate as a buck regulator with the terminals 50 and 51 constituting input and output terminals respectively, or as a boost regulator with the terminals 51 and 50 constituting the input and output terminals respectively.

In particular, a DC converter such as illustrated in FIG. 5 can be desired to provide a low output voltage at the terminals 51 from a much higher input voltage supplied to the terminals 50, for example with an input to output voltage ratio of the order of 10:1 or more. However, this involves difficulties, for example as discussed in the Background above.

More specifically, if the MOSFET 53 is an enhancement mode MOSFET, to turn it fully on the control circuit must drive the gate of the MOSFET to a voltage level above, i.e. more positive than, the input voltage. If the MOSFET 53 is a depletion mode MOSFET, for example to facilitate start-up of the converter, similarly to turn the MOSFET fully on the control circuit must drive the gate of the MOSFET to the input voltage. It is noted that N-channel MOSFETs are preferable to P-channel MOSFETs because they have a smaller die area, and hence less capacitance, for a given on-resistance.

In addition, although it is desirable to be able to power the control circuit from the low output voltage of the converter, it is necessary to start up the converter from the much higher input voltage, leading to complexity of the control circuit and difficulty in integrating it because of the relatively high level of the input voltage.

Further, it can be seen that when the MOSFET 53 is on or conductive it conducts the full output current and the MOSFET 56 receives the full input voltage; conversely when the MOSFET 56 is on it conducts the full output current and the MOSFET 53 receives the full input voltage. Consequently each of the MOSFETs 53 and 56 must be rated for the full input voltage and the full output current, both of which may be relatively high where the converter provides a large ratio between its input and output voltages. The resulting size of the MOSFETs increases their capacitance, thereby increasing switching losses and limiting the switching frequency of the converter.

Figure 6:
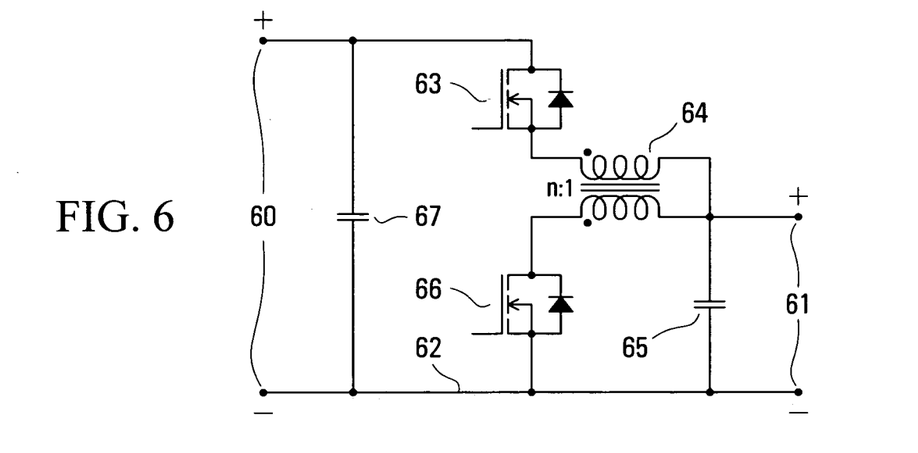
FIG. 6 schematically illustrates a DC converter in accordance with an embodiment of this invention.

FIG. 6 illustrates a DC converter in accordance with an embodiment of this invention. Similarly to FIG. 5, the DC converter of FIG. 6 comprises pairs of terminals 60 and 61 which are input terminals and output terminals respectively for a buck configuration or output terminals and input terminals respectively for a boost configuration, a common line 62 between the input and output, capacitors 67 and 65 connected between the terminals 60 and 61 respectively, and N-channel MOSFETs 63 and 65 constituting controlled switches of the converter. The converter of FIG. 6 differs from that of FIG. 5 in that the series inductor is constituted by a transformer 64. The converter of FIG. 6 (and similarly the converters of FIGS. 7 to 10) is described below in its buck configuration for convenience, but it can be appreciated that it can alternatively be operated in a boost configuration by interchanging its input and output terminals.

More specifically, in the converter of FIG. 6 the series inductor is formed by the two windings of the transformer 64, of which a first winding, referred to here as a primary winding, is connected between the MOSFET 63 and the positive one of the output terminals 61 and a second winding, referred to here as a secondary winding, is connected between the MOSFET 66 and the positive one of the output terminals 61, there being no direct connection between the MOSFETs 63 and 66. Dots adjacent the transformer windings indicate the senses of the windings in conventional manner, and the transformer has a primary to secondary turns ratio of n:1, where n can be less than, equal to, or greater than one. Preferably, n is greater than one, providing advantages as described below.

Thus in the DC converter of FIG. 6, one winding of the transformer 64 is in series with the switch constituted by the MOSFET 63, in a series path between the input and the output of the converter, and the other winding of the transformer 64 is in series with the switch constituted by the MOSFET 66, in a shunt path between the input or the output terminals of the converter.

Thus, unlike the transformer 44 in the flyback converter of FIG. 4 which provides electrical isolation between the input and output of the converter, in the converter of FIG. 6 (and similarly the converters of FIGS. 7 to 10) the transformer 64 does not provide electrical isolation between the input and output of the converter, there still being a common line 62 between the input and output terminals.

In the converter of FIG. 6, the ampere-turns of the primary and secondary windings of the transformer 64 are the same, so that the primary winding, and hence the MOSFET 63, carries 1/n the current of the secondary winding, and hence the MOSFET 66. Denoting the input voltage as Vi and the output voltage as Vo, when the MOSFET 63 is on, the primary winding has a voltage Vi−Vo, so that the secondary winding has a voltage (Vi−Vo)/n and the MOSFET 66 is subject to a voltage of Vo+(Vi−Vo)/n, or (Vi+(n−1)Vo)/n. When the MOSFET 66 is on, the secondary winding has a voltage Vo, so that the primary winding has a voltage nVo and the MOSFET 63 is subject to a voltage of nVo−Vo+Vi, or Vi+(n−1)Vo.

In other words, in the converter of FIG. 6 the MOSFET 63 is subject to n times the voltage and 1/n times the current that the MOSFET 66 is subject to. Thus the turns ratio n of the transformer can be selected to optimize (with n>1) the current stress on the relatively high voltage MOSFET 63 and the voltage stress on the relatively high current MOSFET 66. In this manner, the current and voltage stresses on both switches can be better matched to the characteristics of practical and available MOSFETs. In particular, this enables the MOSFETs to have a smaller on-resistance, and/or to have a smaller size with less capacitance, providing greater efficiency and/or facilitating the use of higher switching frequencies.

Figure 7:
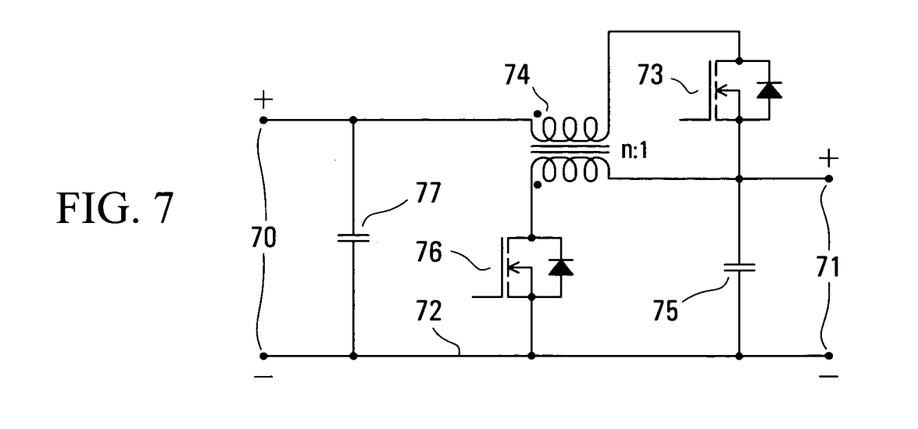
FIG. 7 schematically illustrates a DC converter in accordance with another embodiment of this invention.

FIG. 7 illustrates a DC converter in accordance with another embodiment of this invention. The elements 70 to 77 in the converter of FIG. 7 are substantially the same as the elements 60 to 67 in the converter of FIG. 6, and substantially the same comments and advantages apply as discussed above in relation to FIG. 6. However, in the converter of FIG. 7, in addition, the positions of the primary winding of the transformer 74 and the MOSFET 73 are interchanged, so that the MOSFET 73 has its source connected to the positive one of the terminals 71, and the primary winding of the transformer 74 is connected between the drain of the MOSFET 73 and the positive one of the terminals 70.

Consequently, if the N-channel MOSFET 73 is an enhancement mode MOSFET, in order to turn on the MOSFET its gate must be driven to a voltage level above (more positive than) the voltage of the positive one of the terminals 71. It will be noted that the latter voltage, i.e. the voltage at the source of the MOSFET 73, is a fixed voltage level (subject to a small ripple voltage), compared with a variable source voltage for the MOSFET 53 in the converter of FIG. 5 and for the MOSFET 63 in the converter of FIG. 6.

Especially with a large ratio of input voltage Vi to output voltage Vo for a buck configuration, the control circuit is thus required to drive the gate of the MOSFET 73 to a voltage that can be significantly lower than the relatively high input voltage Vi. Consequently, the requirements for the control circuit can be considerably more easily met, and the control circuit can more easily be integrated because it is not subject to such high voltages. This represents a considerable benefit and advantage over the converters discussed above.

The N-channel MOSFET 73 can alternatively be a depletion mode MOSFET, for which substantially the same comments apply except that the gate must be driven to the source voltage to turn the MOSFET fully on. The use of a depletion mode MOSFET 73 can facilitate start-up of the converter, by initially providing an output voltage to the terminals 71 for powering the control circuit, the MOSFET 73 operating in a linear voltage regulating mode. The control circuit can then control the MOSFETs 73 and 76 for the switching operation of the converter. This is especially advantageous in the configuration of the converter of FIG. 7, for which the control circuit need only provide control voltages within the limits of the output voltage at the terminals 71.

Other measures can alternatively be used to facilitate start-up of the converter, including for example a shunt regulator (e.g. a resistor and a zener diode) or a linear series regulator which can be switched off after start-up of the converter, in either case to provide an initial supply voltage to the control circuit from the input voltage. However, such other measures typically require additional components and may introduce additional losses.

Figure 8:
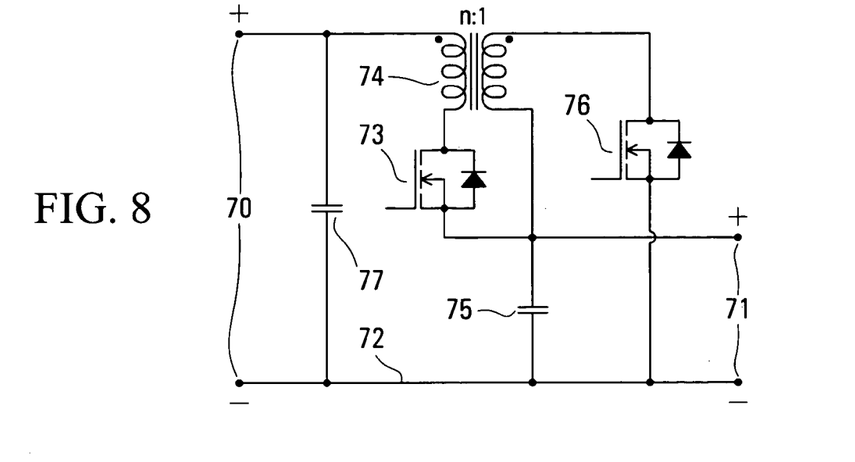
FIG. 8 is an alternative illustration of the DC converter of FIG. 7.

FIG. 8 is an alternative illustration of the DC converter of FIG. 7, using the same elements 70 to 77 in the same arrangement and operating in the same manner as described above.

The transformer 64 or 74 in the DC converters of FIGS. 6 to 8 is assumed to be ideal or perfect; in practice this is not the case, and transformer leakage energy must also be removed. This can be done in various ways similar to those known for transformer reset in known single ended transformer converters, such as the feed forward converter. Two methods are illustrated by way of example in FIGS. 9 and 10 and are described below.

Figure 9:
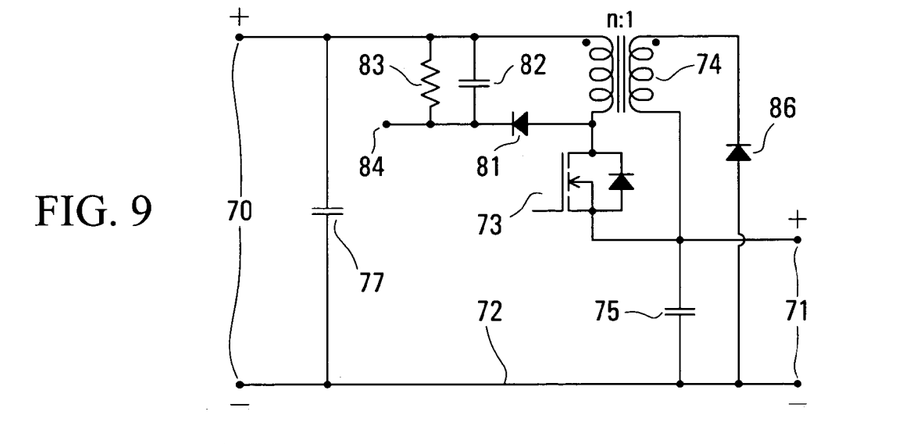
FIG. 9 schematically illustrates a modified form of the DC converter of FIG. 8, including a passive leakage energy removal circuit.

In the DC converter of FIG. 9, a voltage clamp circuit, comprising a diode 81 connecting a parallel combination of a capacitor 82 and a resistor 83 across the primary winding of the transformer 74, provides a passive, dissipative removal of leakage energy. In this arrangement a junction of the diode, capacitor, and resistor is connected to a terminal 84, which can provide an additional output voltage above, i.e. more positive than, the input voltage.

In addition, in the DC converter of FIG. 9 the MOSFET 76 is replaced by a diode 86, providing a buck configuration as described above with reference to FIG. 1 using the diode 16 rather than a switch. A similar replacement may be made in the converters of FIGS. 6 to 8 and FIG. 10. Conversely, a boost configuration, as described above with reference to FIG. 2 using the diode 23 rather than a switch, can be provided for any of the converters of FIGS. 6 to 8 and FIG. 10 by replacing the MOSFET 63 or 73 by a diode.

The additional output voltage provided at the terminal 84 in the converter of FIG. 9 can be particularly useful in DC converter applications. For example, the DC converter of FIG. 9 may be used to produce a low voltage supply for a control or drive circuit for the MOSFET switches of one or more other DC converters, operating from the same input voltage. If the other DC converters have a conventional form as in FIG. 5, the driver for the high side MOSFET 53 must drive its gate to a voltage level above the input voltage, as described above. The additional output voltage at the terminal 84 of the converter of FIG. 9 can be used as a supply voltage to this driver to facilitate this. Conveniently, the drive circuit and the converter of FIG. 9 can be combined in a single, integrated package or form.

More specifically, the voltage at the terminal 84 is about $n(Vo+V1)-V2$ above the input voltage Vi, where n and Vo are the transformer turns ratio and output voltage of the converter of FIG. 9 respectively as above, and V1 and V2 are the forward voltage drops of the diodes 86 and 81 respectively. For example, if Vo=3.3 volts for powering the drive circuit, then a turns ratio of n=1.5 provides at the terminal 84 a voltage of about Vi+5 volts which is convenient for the high side MOSFET drive circuit.

Figure 10:
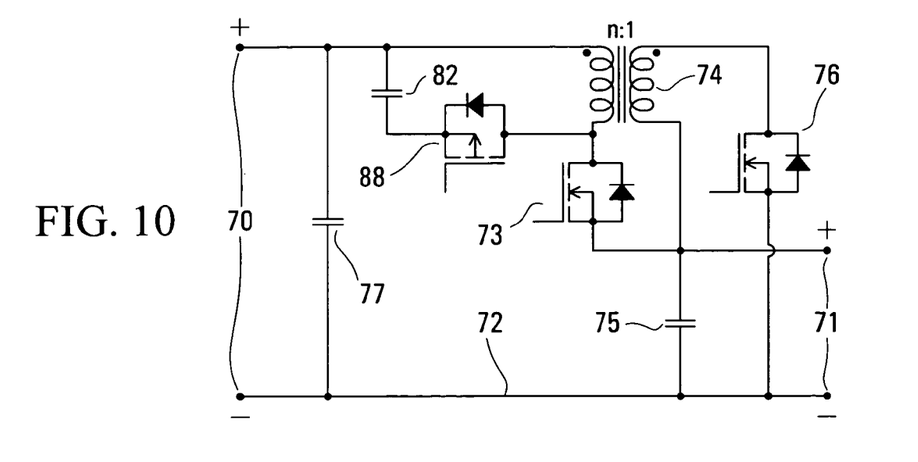
FIG. 10 schematically illustrates another modified form of the DC converter of FIG. 8, including an active circuit for leakage energy recovery.

In the DC converter of FIG. 10, the diode 81 is replaced by a P-channel MOSFET 88, and the resistor 83 is omitted. The MOSFET 88 and the capacitor 82 form an active leakage energy recovery circuit, leakage energy being transferred first to the capacitor 82 from the leakage inductance of the transformer 74 and then to the capacitor 75 and the output of the converter. The MOSFET 88 is controlled by the control circuit in synchronism with the MOSFETs 73 and 76, being turned on when the MOSFET 73 is turned off.

Although FIGS. 9 and 10 illustrate each leakage energy removal circuit as being coupled to the primary winding of the transformer 74, these or other circuits can alternatively be coupled to the secondary winding (or to a separate third winding, not shown) of the transformer 74.

Figure 11:
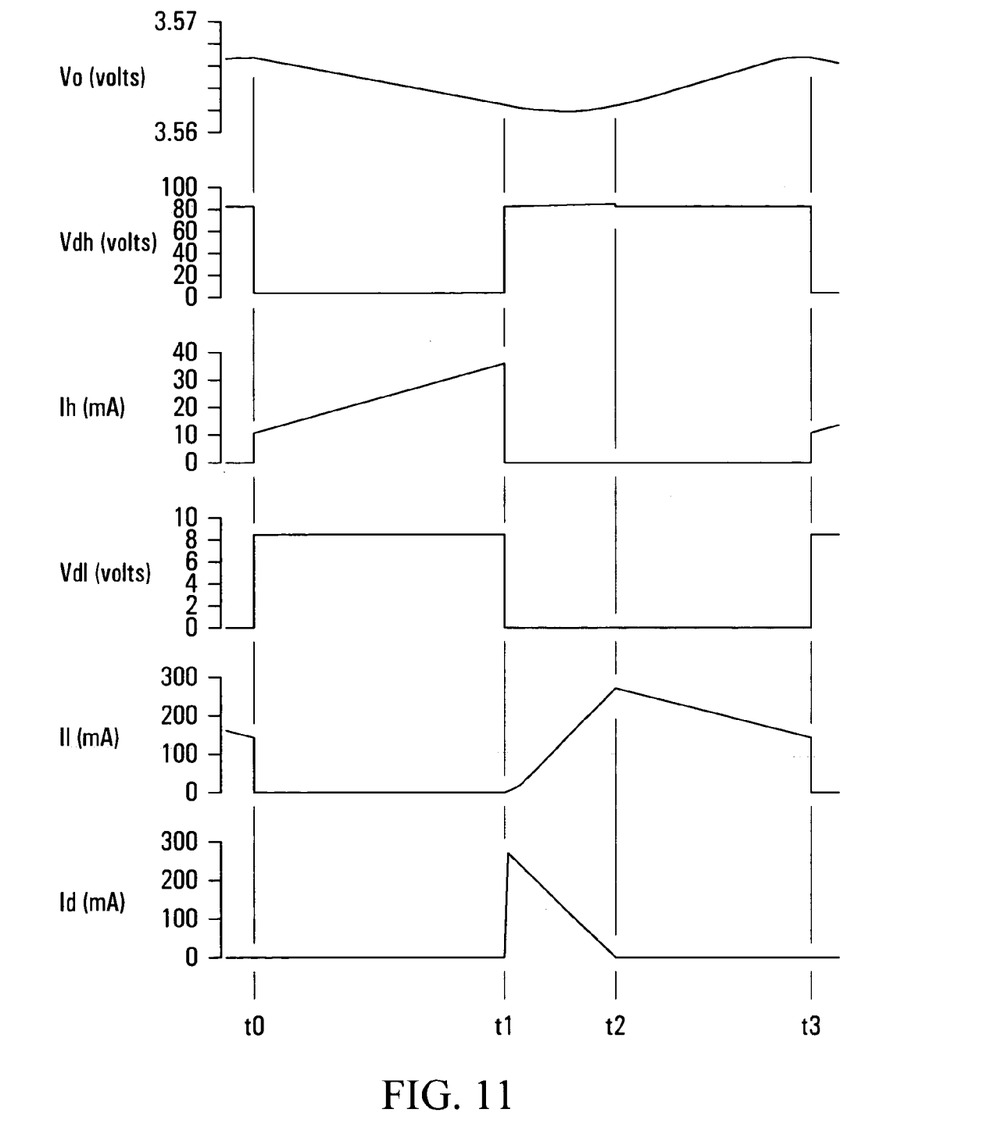
FIG. 11 diagrammatically illustrates waveforms which can occur in operation of the DC converter of FIG. 7 or FIG. 8.

FIG. 11 illustrates, for one switching cycle, waveforms which can occur in operation of the DC converter of FIG. 7 or FIG. 8, optionally with the voltage clamp circuit of FIG. 9. It will be appreciated that these waveforms are only given by way of example, and that the waveforms can vary considerable depending upon the parameters of the converter.

More specifically, FIG. 11 illustrates, from top to bottom, the output voltage Vo, a voltage Vdh at the drain of the high side MOSFET 73, a source-drain current Ih of the high side MOSFET 73, a voltage Vdl at the drain of the low side MOSFET 76, a source-drain current Il of the low side MOSFET 76, and, in the event that the voltage clamp circuit of FIG. 9 is provided, a current Id in the diode 81. The waveforms and values given by way of example in FIG. 11 assume an input voltage Vi of 50 volts, an output voltage Vo of about 3.56 volts, a transformer turns ratio n of 10, a 33 ohm output load. (i.e. an output load current of about 0.11 amps), and the use of a depletion mode MOSFET for the high side MOSFET 73. It will be noted that the current and voltage scales shown in FIG. 11 differ from one another.

As shown in FIG. 11, the output voltage Vo has a small ripple, less than 0.01 volts peak-to-peak. The duty cycle is about 45% as shown by the waveforms of the voltages Vdh and Vdl, the illustrated cycle commencing at a time t0, switching at a time t1, and ending at a time t3. The maximum value of the voltage Vdh of the high side MOSFET 73 is about 10 times that of the low side MOSFET 76, corresponding to the transformer turns ratio of n=10, and conversely the maximum current Ih of the high side MOSFET 73 is about one tenth the maximum current Il of the low side MOSFET 76. Commencing at the time t1 and until a time t2, the current Il of the low side MOSFET 76 ramps up due to the leakage inductance of the transformer 74; during this interval the diode 81 of the voltage clamp circuit of FIG. 9, assuming that this is provided, is forward biassed to conduct the current Id as shown at the bottom of FIG. 11.

Figure 12:
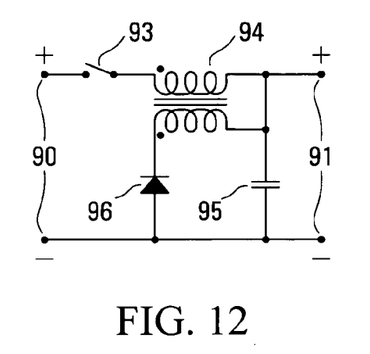
FIGS. 12 to 15 schematically illustrate various basic forms of DC converter according to further embodiments of the invention, having a buck configuration.

FIG. 12 illustrates a basic form of DC converter, having a buck configuration, according to an embodiment of the invention. This generally corresponds to the configuration of FIG. 6, except that an input capacitor is omitted, the high side MOSFET is represented as a switch 93, and the low side MOSFET is replaced by a diode 96. The converter also has two input terminals 90, two output terminals 91, a transformer 94 constituting the inductive component of the converter, and an output capacitor 95 connected between the two output terminals 91. The transformer 94 has one winding in series with the switch 93 and the other winding in series with the diode 96. When the switch 93 is closed the output capacitor 95 is coupled via the one winding to the input voltage, and when the switch 93 is open the diode 96 couples the other winding to the output capacitor 95.

Figure 13:
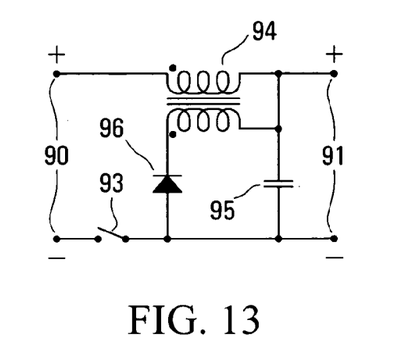
Figure 14:
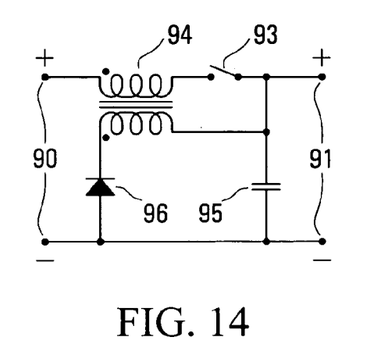

It will be appreciated that the input terminals 90, the switch 93, and the one winding of the transformer 94 are all in series and accordingly can be arranged in any sequence. FIG. 13 illustrates an alternative arrangement in which the switch 93 is provided on the other side of the input terminals 90, and FIG. 14 illustrates another alternative in which the positions of the switch 93 and the one winding of the transformer 94 are interchanged from that shown in FIG. 12. The configuration of FIG. 14 is similar to that of FIG. 7, except that the input capacitor is omitted, the high side MOSFET is represented as the switch 93, and the low side MOSFET is replaced by the diode 96.

Figure 15:
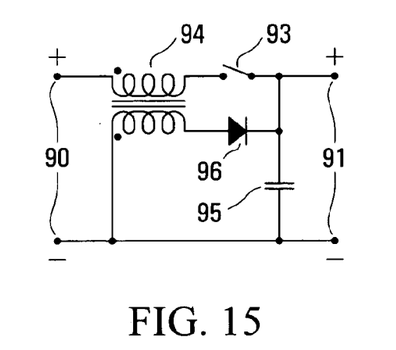

The diode 96 and the other winding of the transformer are also in series, in a shunt path across the terminals 91, and accordingly the positions of these can also be exchanged. For example, FIG. 15 illustrates the converter of FIG. 14 modified by exchanging the positions of the diode 96 and this other winding of the transformer. These and similar exchanges of series elements result in equivalent forms of the converter, although some of these forms may be more practical to implement or may have advantages over other forms, for example as described above with reference to FIGS. 6 and 7.

In any of these forms of the converter, the diode 96 can be replaced by a controlled switch. For example, FIG. 16 illustrates the converter of FIG. 15 with the diode 96 replaced by a switch 96', which is controlled by a control circuit (not shown) to be closed when the switch 93 is open, and to be open when the switch 93 is closed.

Figure 16:
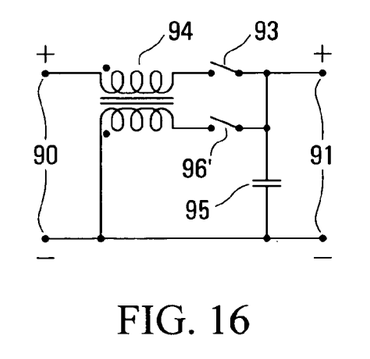
FIGS. 16 and 17 illustrate modifications of the DC converter of FIG. 15.
Figure 17:
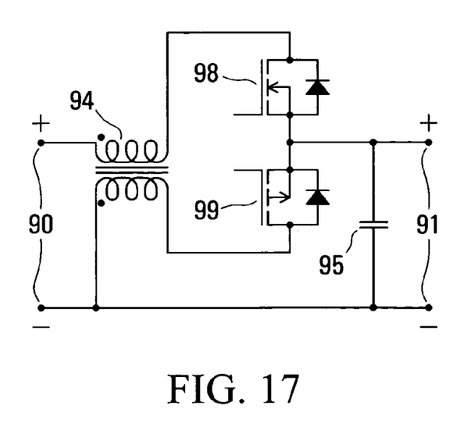

For example, FIG. 17 illustrates an implementation of the converter of FIG. 16, in which the switch 93 is constituted by an N-channel MOSFET 98 and the switch 96' is constituted by a P-channel MOSFET 99, the sources of the MOSFETs being connected together and to the positive one of the output terminals 91. This provides the advantage that the gates of the complementary MOSFETs 98 and 99 can be driven by a single gate drive signal, which swings both positively and negatively relative to the positive DC output voltage.

Figure 18:
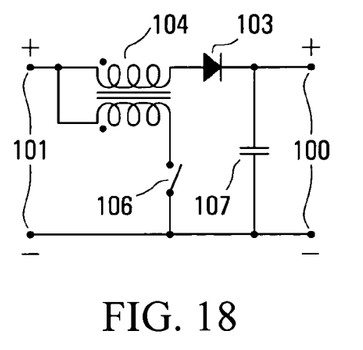
FIGS. 18 to 20 schematically illustrate various basic forms of DC converter according to further embodiments of the invention, having a boost configuration.

Conversely, FIG. 18 illustrates a basic form of DC converter, having a boost configuration, according to an embodiment of the invention. This generally corresponds to the configuration of FIG. 6, reversed for the boost configuration, except that an input capacitor is omitted, the high side MOSFET is replaced by a diode 103, and the low side MOSFET is represented as a switch 106. The converter also has two input terminals 101, two output terminals 100, a transformer 104 constituting the inductive component of the converter, and an output capacitor 107 connected between the two output terminals, 100. The transformer 104 has one winding in series with the diode 103 and the other winding in series with the switch 106. When the switch 106 is closed this other winding is coupled to the input voltage, and when the switch 106 is open the diode 103 couples the output capacitor 105 via the one winding to the input voltage.

Figure 19:
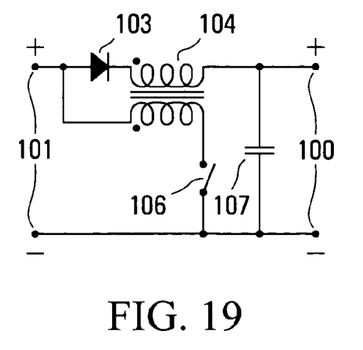
Figure 20:
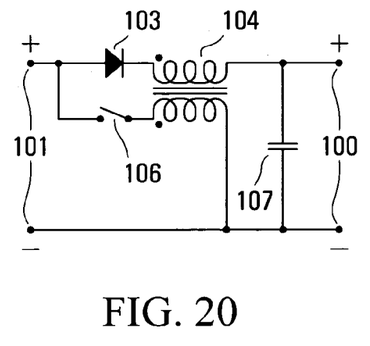

As in the case of the buck configuration as described above, series components (i.e. the diode 103, the one winding of the transformer 104, and the output terminals 100 with the output capacitor 107, on the one hand, and the switch 106 and the other winding of the transformer 104, on the other hand) can be arranged in any sequence without changing the function of the converter. For example, FIG. 19 illustrates an alternative arrangement in which the positions of the diode 103 and the one winding of the transformer 104 are interchanged from that shown in FIG. 12, and FIG. 20 illustrates another alternative arrangement in which the positions of the switch 106 and the other winding of the transformer 104 are also interchanged.

Also as described above, the diode 103 can be replaced by a controlled switch. For example, FIG. 21 illustrates the converter of FIG. 20 with the diode 103 replaced by a switch 103', which is controlled by a control circuit (not shown) to be closed when the switch 106 is open, and to be open when the switch 106 is closed.

Figure 21:
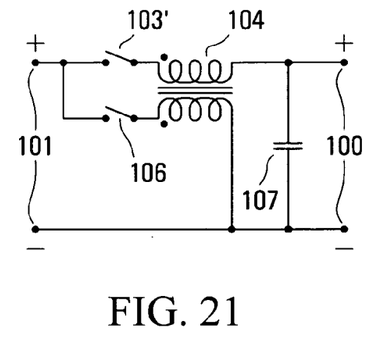
FIGS. 21 and 22 illustrates modifications of the DC converter of FIG. 20.
Figure 22:
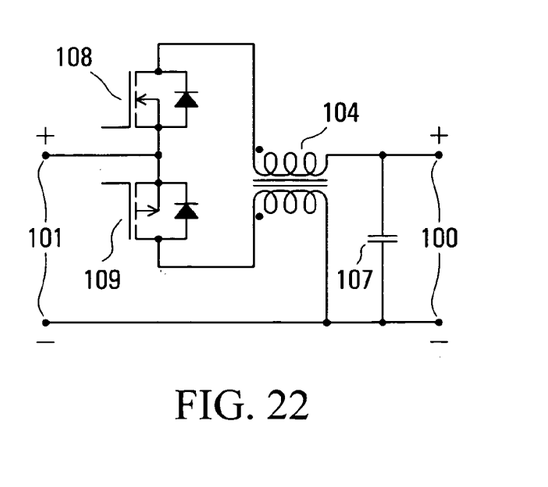

By way of further example, FIG. 22 illustrates an implementation of the converter of FIG. 21, in which the switch 103' is constituted by an N-channel MOSFET 108 and the switch 106 is constituted by a P-channel MOSFET 109, the sources of the MOSFETs being connected together and to the positive one of the input terminals 101. This provides the advantage that the gates of the complementary MOSFETs 108 and 109 can be driven by a single gate drive signal, which swings both positively and negatively relative to the positive DC input voltage.

It will be appreciated that, with input capacitors provided between the input terminals 90 in the converter of FIG. 17 and between the input terminals 101 in the converter of FIG. 22, these converters form the same circuit which can be used in either a buck or a boost configuration.

Although embodiments of the invention described above use MOSFETs with parallel diodes as switches, this need not be the case and other forms of switch, including bipolar transistors, IGBTs, etc. with or without internal or external parallel diodes can alternatively be used.

In addition, although the embodiments of the invention described above relate to a converter operated in the first and second quadrants, i.e. the components and input and output voltages have the polarities as shown, the polarities may be reversed with the converter operating in the third and fourth quadrants, or the switches described above may be replaced by appropriately controlled bidirectional (AC) switches for operation of the converter in all four quadrants. Accordingly, the converter can also be used in applications such as for a variable bipolar DC regulator, audio power amplifier, telecommunications ringer, etc.

Thus although particular embodiments of the invention and examples of variations and applications have been described above in detail, it can be appreciated that these and numerous other modifications, variations, and adaptations may be made without departing from the scope of the invention as defined in the claims.

The invention claimed is:

1. A DC converter comprising two input terminals, two output terminals, an output capacitor coupled between the two output terminals, an inductance in a series path between the input and output terminals, a first controlled switch, and a diode or a second controlled switch, the converter having a buck or boost configuration for producing an output voltage at the output terminals from an input voltage supplied to the input terminals, wherein the inductance is provided by a transformer having one winding coupled in series with the first controlled switch and another winding coupled in series with the diode or second controlled switch, current in said one winding being switched by the first controlled switch to produce discontinuous current in said another winding.

2. A DC converter as claimed in claim 1 wherein said one winding and the first controlled switch are coupled in said series path between the input and output terminals, and said another winding and the diode or second controlled switch are coupled in series between the two output terminals, the DC converter having a buck configuration.

3. A DC converter as claimed in claim 2 wherein the first controlled switch is coupled in said series path between said one winding and one of the output terminals.

4. A DC converter as claimed in claim 3 wherein the first controlled switch comprises a MOSFET having its source coupled to said one of the output terminals.

5. A DC convener as claimed in claim 4 wherein the diode or second controlled switch comprises a MOSFET having its source coupled to said one of the output terminals.

6. A DC converter as claimed in claim 4 wherein said one winding has more turns than said another winding.

7. A DC converter as claimed in claim 3 wherein said one winding has more turns than said another winding.

8. A DC converter as claimed in claim 3 and comprising a leakage energy removal circuit coupled to one of the windings of the transformer.

9. A DC converter as claimed in claim 8 wherein the leakage energy removal circuit comprises a diode coupling a parallel combination of a capacitor and a resistor to one of said windings.

10. A DC converter as claimed in claim 9 wherein the leakage energy removal circuit is coupled to said one winding, and an auxiliary output voltage is derived from a junction of the diode, capacitor, and resistor of the leakage energy removal circuit.

11. A DC convener as claimed in claim 8 wherein the leakage energy removal circuit comprises a controlled switch for coupling a capacitor to one of the windings of the transformer.

12. A DC converter as claimed in claim 2 wherein said one winding has more turns than said another winding.

13. A DC converter as claimed in claim 2 wherein the diode or second controlled switch comprises a second controlled switch.

14. A DC converter as claimed in claim 2 and comprising a leakage energy removal circuit coupled to one of the windings of the transformer.

15. A DC converter as claimed in claim 14 wherein the leakage energy removal circuit comprises a diode coupling a parallel combination of a capacitor and a resistor to one of said windings.

16. A DC converter as claimed in claim 15 wherein the leakage energy removal circuit is coupled to said one winding, and an auxiliary output voltage is derived from a junction of the diode, capacitor, and resistor of the leakage energy removal circuit.

17. A DC converter as claimed in claim 14 wherein the leakage energy removal circuit comprises a controlled switch for coupling a capacitor to one of the windings of the transformer.

18. A DC converter as claimed in claim 1 wherein said one winding and the first controlled switch are coupled in series between the two input terminals, and said another winding and the diode or second controlled switch are coupled in said series path between the input and output terminals, the DC converter having a boost configuration.

19. A DC converter as claimed in claim 18 wherein the diode or second controlled switch is coupled in said series path between one of the input terminals and said another winding.

20. A DC converter as claimed in claim 19 wherein the diode or second controlled switch comprises a MOSFET having its source coupled to said one of the input terminals.

21. A DC converter as claimed in claim 20 wherein the first controlled switch comprises a MOSFET having its source coupled to said one of the input terminals.

22. A DC convener as claimed in claim 20 wherein said another winding has more turns than said one winding.

23. A DC converter as claimed in claim 19 wherein said another winding has more turns than said one winding.

24. A DC converter as claimed in claim 18 wherein said another winding has more turns than said one winding.

25. A DC converter having a buck or boost configuration and comprising a first controlled switch, an inductor, a diode or a second controlled switch, and an output capacitor for producing at output terminals of the converter an output voltage in response to an input voltage supplied to input terminals of the converter, wherein the inductor is in a series path between the input and output terminals and comprises a transformer having a first winding in series with the first switch and a second winding in series with the diode or second controlled switch, current in the first winding being switched by the first switch to produce discontinuous current in the second winding.

* * * * *

UNITED STATES PATENT AND TRADEMARK OFFICE
CERTIFICATE OF CORRECTION

| | | |
|---|---|---|
| PATENT NO. | : 7,193,396 B2 | Page 1 of 1 |
| APPLICATION NO. | : 10/744019 | |
| DATED | : March 20, 2007 | |
| INVENTOR(S) | : Ray Orr | |

It is certified that error appears in the above-identified patent and that said Letters Patent is hereby corrected as shown below:

Column 12, Claim 11, line 56, "convener" should read --converter--.

Column 14, Claim 22, line 4, "convener" should read --converter--.

Signed and Sealed this

Twenty-fourth Day of June, 2008

JON W. DUDAS
*Director of the United States Patent and Trademark Office*